Feb. 16, 1937. M. L. D. McFARLANE 2,070,913
TRANSLATION OF MODULATED ELECTRIC CURRENT INTO A SERIES OF IMPULSES
Filed June 3, 1926 6 Sheets-Sheet 1
Fig. 1.
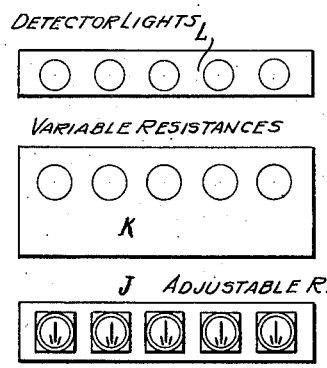
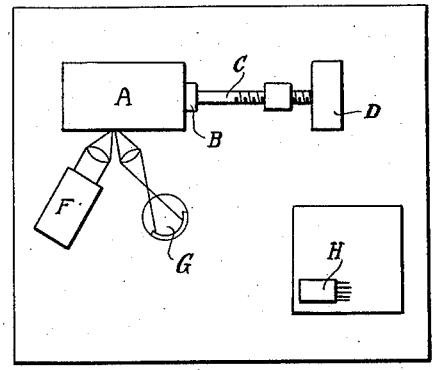
Fig. 2.
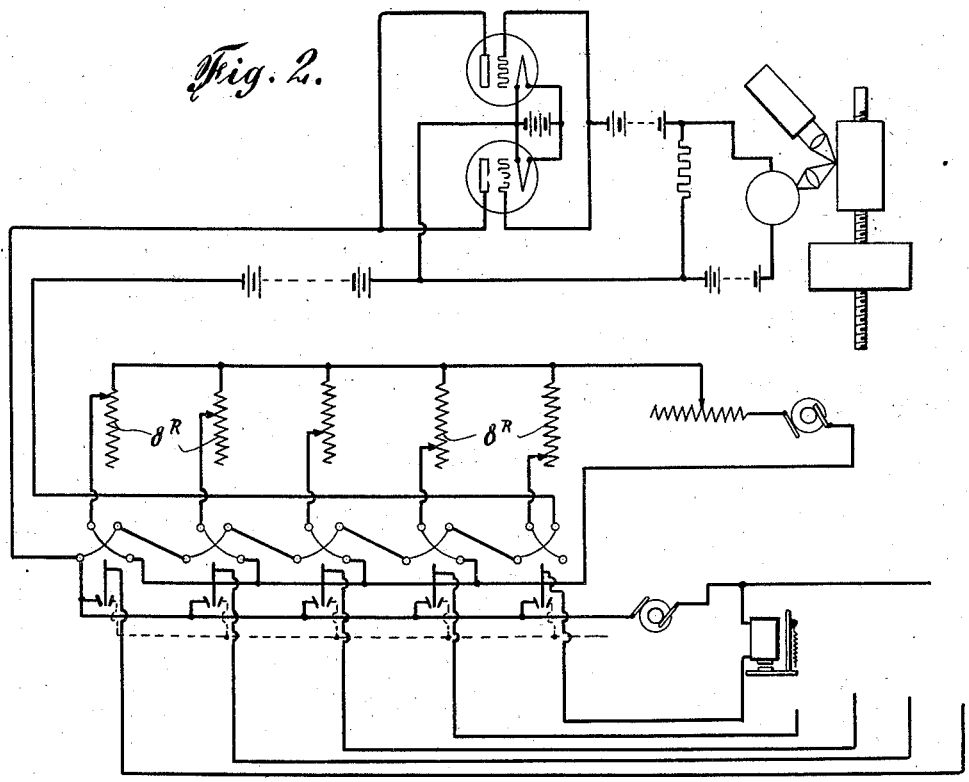
INVENTOR
M. L. D. McFARLANE
BY Marks & Clerk
ATTORNEYS Feb. 16, 1937. M. L. D. McFARLANE 2,070,913
TRANSLATION OF MODULATED ELECTRIC CURRENT INTO A SERIES OF IMPULSES
Filed June 3, 1926   6 Sheets-Sheet 2
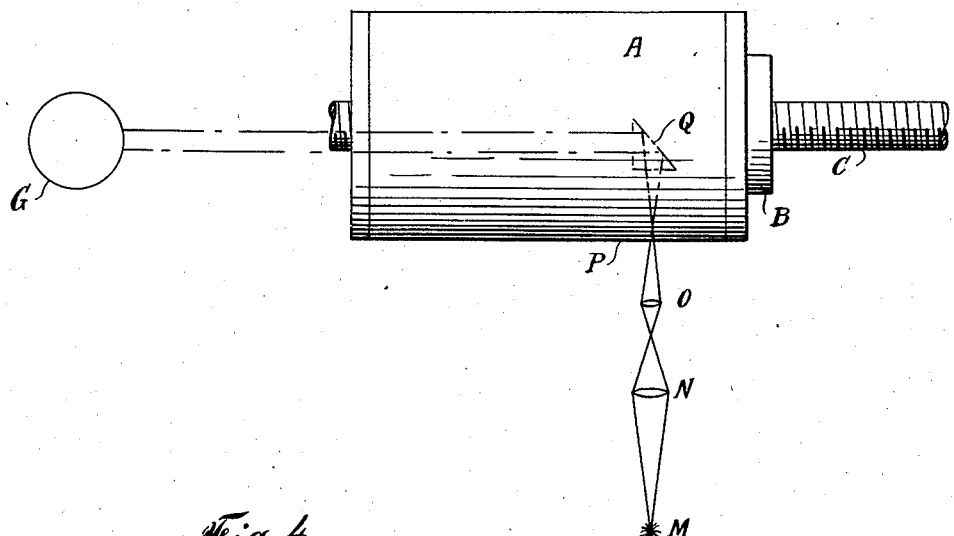
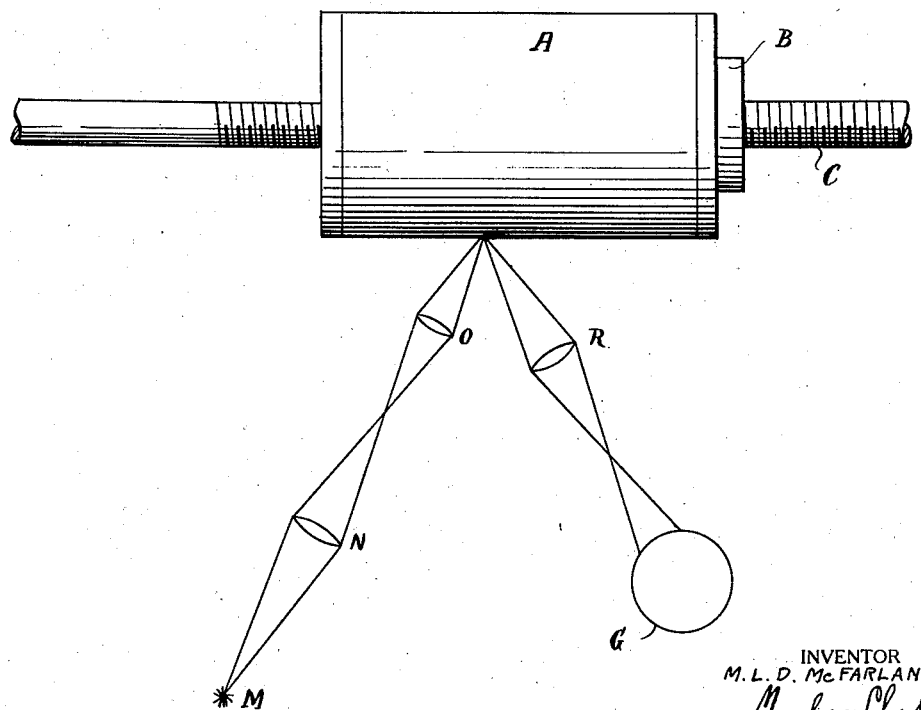
INVENTOR
M. L. D. McFARLANE
BY Marks & Clerk
ATTORNEYS Feb. 16, 1937.  M. L. D. McFARLANE  2,070,913
TRANSLATION OF MODULATED ELECTRIC CURRENT INTO A SERIES OF IMPULSES
Filed June 3, 1926    6 Sheets-Sheet 3

INVENTOR
M.L.D. McFARLANE
BY Marks & Clerk
ATTORNEYS

Feb. 16, 1937.  M. L. D. McFARLANE  2,070,913
TRANSLATION OF MODULATED ELECTRIC CURRENT INTO A SERIES OF IMPULSES
Filed June 3, 1926  6 Sheets-Sheet 4

INVENTOR
M. L. D. McFARLANE
BY Marks & Clerk
ATTORNEYS

Feb. 16, 1937.    M. L. D. McFARLANE    2,070,913
TRANSLATION OF MODULATED ELECTRIC CURRENT INTO A SERIES OF IMPULSES
Filed June 3, 1926    6 Sheets-Sheet 5

INVENTOR
M. L. D. McFARLANE
BY Marks & Clerk
ATTORNEYS

Feb. 16, 1937.  M. L. D. McFARLANE  2,070,913
TRANSLATION OF MODULATED ELECTRIC CURRENT INTO A SERIES OF IMPULSES
Filed June 3, 1926  6 Sheets-Sheet 6
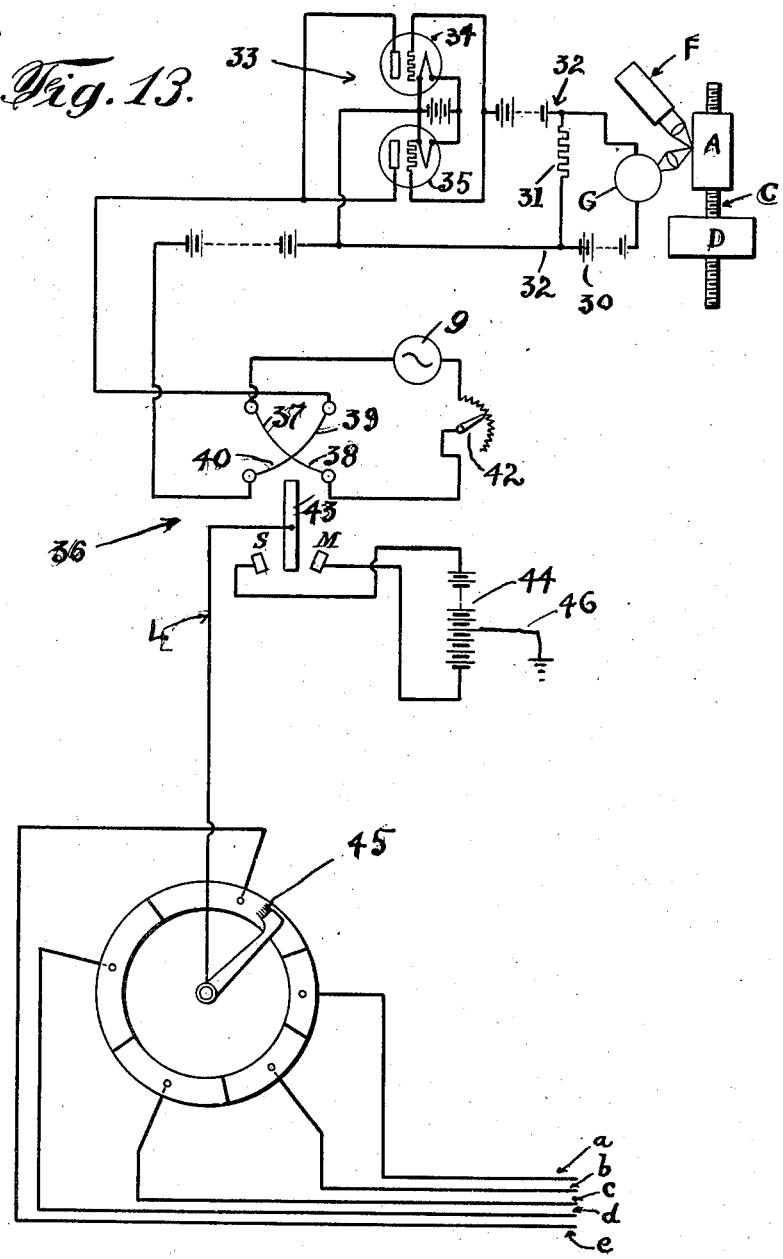
Maynard L. D. McFarlane
INVENTOR
BY George Ramsey
ATTORNEY Patented Feb. 16, 1937

2,070,913

UNITED STATES PATENT OFFICE 2,070,913

TRANSLATION OF MODULATED ELECTRIC CURRENT INTO A SERIES OF IMPULSES

Maynard Leslie Deeds McFarlane, Brooklyn, N. Y.

Application June 3, 1926, Serial No. 113,432
In Great Britain April 1, 1926

14 Claims. (Cl. 178—5)

This invention relates to the conversion of a modulated electric current into a series of impulses.

The invention will be described with particular reference to a system of transmitting pictures, writing or the like, but it will be understood that the invention in its broadest aspect is not restricted to this particular embodiment, the application of the invention to the sending of pictures being chosen by way of an illustrative example and being one in which actual use is being made of the invention with very satisfactory results especially as to quickness and ease of transmission, since it is thereby made possible to transmit pictures or the like by electrical impulses in the form of a message as transmitted in standard telegraphic practice.

In systems of telephotography it is generally necessary to form a reproduction of the representation to be transmitted and such systems have been proposed in which light transmitted through a negative has been caused to modulate the current flow in an electrical circuit, other apparatus being operated by these modulated signals to reconstitute the original representation.

Other and comparatively complicated systems have been proposed according to which electrical impulses of intensity governed by the graduations of a photographic negative have controlled sources of light of different power in order to reproduce a pictorial image of the original. Systems of the type referred to have not, as far as we are aware, achieved any considerable success owing to draw-backs inherent in the methods employed. These draw-backs were substantially overcome by the system of telephotography described in prior British Patent No. 197,402 according to which an intermediate record of the original was made in the form of a perforated tape preferably employing the 5-unit or Baudot code. While this method of transmission obtains very satisfactory results the extra apparatus required to make the intermediate record at either or both ends of the transmission line is not essential where a private line is available.

The general object of the invention is to provide a method of converting a modulated electric current into a series of impulses, which impulses may be employed for a variety of purposes of which a particular example is hereinafter given by way of illustration of the application of the invention. It is to be understood, however, that the utilization of said impulses derived from the modulated electric current is applicable to a wide variety of uses and is in no way limited to the specific application described.

A feature of the invention is the application of a modulated electric current converted into a series of impulses, according to my invention, to the transmission of a picture or other representation of an original. This can be effected with or without the formation of an intermediate record.

With the above object in view the invention consists in a method of controlling an electrical system whereby a modulated electric current is transformed into a series of impulses, said method comprising impressing upon an electric current fluctuations caused by modulations due to an exciting cause and means transforming said modulated current into a series of impulses which may be utilized for any desired purpose.

The invention further consists in a method of controlling an electrical system in which fluctuations representing variations of an original are impressed upon the electric current and the series of impulses obtained are utilized to produce a representation of said original.

The invention further consists in a method in which light is thrown upon a pictorial or other representation and the tones thereof interpreted by the varying amount of transmitted or reflected light, said light acting to modulate the electric current which is transformed to produce a series of telegraphic impulses.

The invention further consists in transforming the modulated current obtained by the method set forth in the preceding paragraph into a series of telegraphic impulses by the use of relay means.

The invention further comprises a method of pictorial or other transmission, comprising employing a negative or print of a representation to control light sensitive modulating means acting to impress fluctuations corresponding to the amount of light transmitted or reflected by said representation upon an electrical current flowing in a circuit and transforming said modulating current into a series of impulses adapted to be utilized in forming a reproduction of said representation.

The invention further comprises apparatus for controlling an electrical system comprising modulating means adapted to be acted on by fluctuations desired to be registered, said fluctuations being impressed upon said system by said modulating means and means acting to transform the resulting modulated current into a series of impulses.

The invention further comprises apparatus as set forth in the preceding paragraphs in which said impulses are utilized to control means acting to record said variations.

The invention still further consists in apparatus for controlling an electrical system by modulating means in the form of a light sensitive element such as a photo-electric cell, and impressing said fluctuations upon said system, and transforming said modulations into a series of impulses.

Further features of the invention will hereinafter appear and be specifically pointed out in the appended claims.

In the accompanying drawings in which various embodiments of the invention are illustrated in diagrammatic form—

Figure 1 shows the general lay-out of a system for transmitting pictures or the like according to my invention rendered into the form of an intermediate record, such as a standard telegraphic tape;

Fig. 2 is a schematic diagram of the electrical circuits employed in the lay-out of Fig. 1;

Fig. 3 is a detail view of an apparatus used to analyze a picture.

Fig. 4 is a detail view showing another form of analyzing apparatus;

Fig. 10 shows a modified output circuit incorporating a commutator having five segments and adapted to be used when transmitting the telegraphic signals direct to a receiving station for reproduction as a picture or the like;

Fig. 13 is a schematic diagram showing connected together the scanning unit of Fig. 1, the amplifier of Fig. 6, the vibrating relay of Fig. 7 and the rotating commutator of Fig. 10.

Similar parts are indicated by similar numerals in the various figures.

Figure 5:
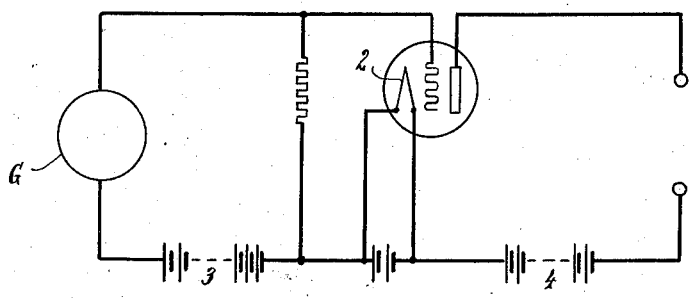
Fig. 5 represents an amplifying circuit adapted to be used in the method and apparatus of my invention.

In Fig. 1, A represents a picture mounted upon a mandrel B, which is mounted upon a shaft C rotated by suitable gearing arranged in the gear case D. The shaft C is provided with a fine thread engaging in a threaded block E, the rotation of said shaft acting to rotate and laterally feed the picture across the path of a pencil of light projected on the picture by a suitable source of illumination arranged in the casing F, the light, controlled by the characteristics of the picture then falling upon the photo-electric cell G. The photo-electric cell acts to modulate the electric current operating the perforated mechanism H which may be of any suitable character, through a bank of relays J individually adjusted by variable resistances K and their adjustment visually verified by detector lights L. For the sake of convenience the perforating mechanism used for producing a tape adapted to be utilized in a standard 5-unit transmitting machine is employed.

The analyzing means briefly referred to in the reference to Fig. 1 are more fully illustrated in Fig. 3. In Fig. 3 an intense source of illumination M is shown, light from which is focused by any suitable optical system such as two lenses N—O to a point P upon the picture which, in the form shown, is a transparency mounted upon a suitable support such as a glass cylinder. The light passing through the transparency falls upon a prism Q, which directs the received beam upon the photo-electric cell G. While this form of analyzing means gives very satisfactory results, I prefer to use the arrangement of apparatus shown in Fig. 4, in which a picture, in the form of a print, is mounted upon a cylinder and the pencil of light focused at the point P on the print is reflected from the surface thereof through a suitable lense system R upon the photo-electric cell G. This arrangement possesses considerable advantage over the arrangement shown in Fig. 3 since it is not necessary to prepare a suitable negative.

A further modification of the analyzing means (not illustrated) which may have advantages in particular circumstances, is to employ a beam of light in place of the focused pencil in the arrangement just described, the light reflected from a point within the illuminated area being directed by a suitable lens system upon the photo-electric cell.

The current flowing through the photo-electric cell is amplified by any suitable means but preferably by the use of electronic valve devices such as 3-electrode amplifiers and a number of such circuits will be described. The photo-electric cell is connected in the grid circuit of the electronic valve device for instance a 3-electrode tube as will be understood by those familiar with amplification with these devices. The current flowing in the circuit is a current which may be of any suitable kind such as D. C. or one having a varying value of a constant characteristic such as a pulsating current; the latter form is convenient in that the usual transformer devices may be utilized for amplification. Current may of course be supplied from any suitable source, as for instance a direct current generator or a source of direct current used in conjunction with suitable means such as a mechanically operated commutator, a buzzer or an oscillator tube to transform continuous into intermittent current.

Figure 6:
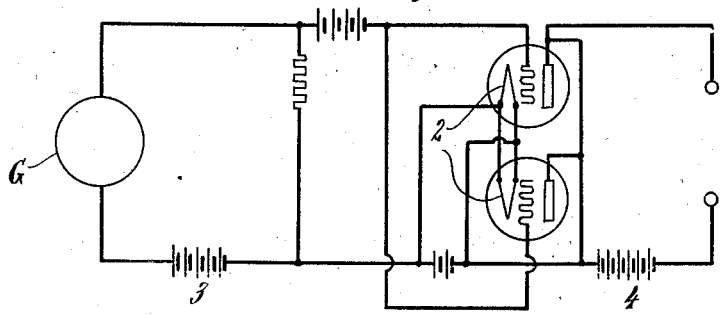
Fig. 6 represents a modified amplifying circuit showing a circuit incorporating a biasing battery and 3-electrode amplifiers arranged in parallel.
Figure 9:
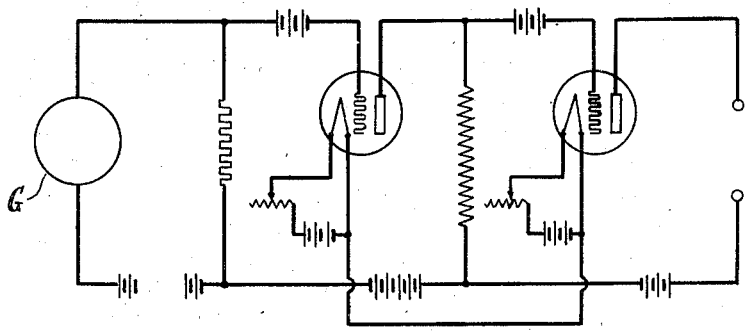
Fig. 9 shows a circuit including two 3-electrode amplifiers with resistance coupling, biasing battery being provided for the grid of each amplifier.

In Fig. 5 the photo-electric cell G is shown connected to the grid of the 3-electrode amplifier 2, 3 representing the battery for the photo-electric cell and 4 the battery for the plate of the amplifier. While I generally prefer to employ a grid leak as shown, it will be understood of course that amplifying circuits without a grid leak or incorporating a biasing battery can be employed; for instance very satisfactory amplification has been obtained from a circuit in which neither a grid leak nor biasing battery are utilized, although in this case careful adjustment of the voltages applied to the photo-electric cell and amplifying tube or tubes is required. It will further be understood that where a pulsating current is used means supplying the interrupted current may be positioned in any suitable part of the circuit and not necessarily before the first amplifying tube and further it will be understood that any suitable arrangement or number of amplifying tubes may be employed; for instance satisfactory results have been obtained from two or three amplifying tubes arranged in parallel as well as from a number of tubes arranged in straight cascade formation, as shown in Fig. 9. It will be observed that the tubes shown in the circuit arrangement of Fig. 2 and in greater detail in Fig. 6 are arranged in parallel, the grid and plate elements being connected by a common lead. In the case of a pulsating current modulated by the photo-electric cell this may of course be amplified by any suitable means such as transformers, resistance coupling, capacity coupling and the like.

Various output circuits may of course be combined with the amplifying circuits above described, the function of the current flowing in the output circuit being to provide means of recording (by perforation or otherwise) the varying characteristics of the original.

Figure 7:
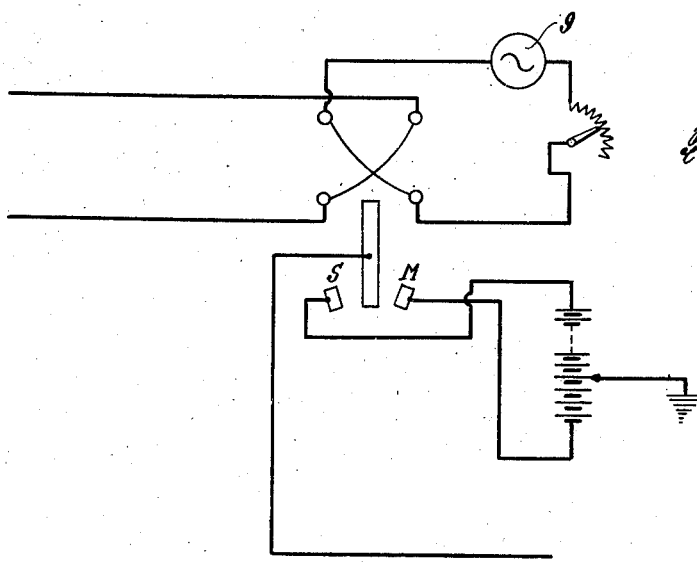
Fig. 7 shows an output circuit which may be utilized with any of the circuits shown in Figs. 5 and 6 if a direct circuit is to be employed, and incorporating a polarized relay.

The fluctuations of current caused by the variations in the intensity of light falling upon the light sensitive element, such as a photo-electric cell, are impressed upon the grid of the amplifying tube and in the circuit shown in Fig. 7, the amplified current reproducing these variations flows through the coil of a vibrating relay causing the variations in the electro-magnetic pull exerted on the tongue of said relay thus causing variations in the vibration of the armature and corresponding variations in the duration of the current in the output circuit of the relay.

The relay may be conveniently of the polarized type of any suitable style. A bias may be given to the relay by the use of a bias battery in order to obtain a retarding effect to slow down the swing of the needle of the relay. It is immaterial what means is employed to obtain the retardation effect but it should be understood that retardation is not essential being employed in a particular circuit used for considerations of working.

A particular use of the output circuit is to control the operation of perforating mechanism serving to render the analyzed picture or the like into a perforated tape of the 5-unit or Baudot code as used in standard telegraphic practice. A variety of such circuits will now be described.

Figure 8:
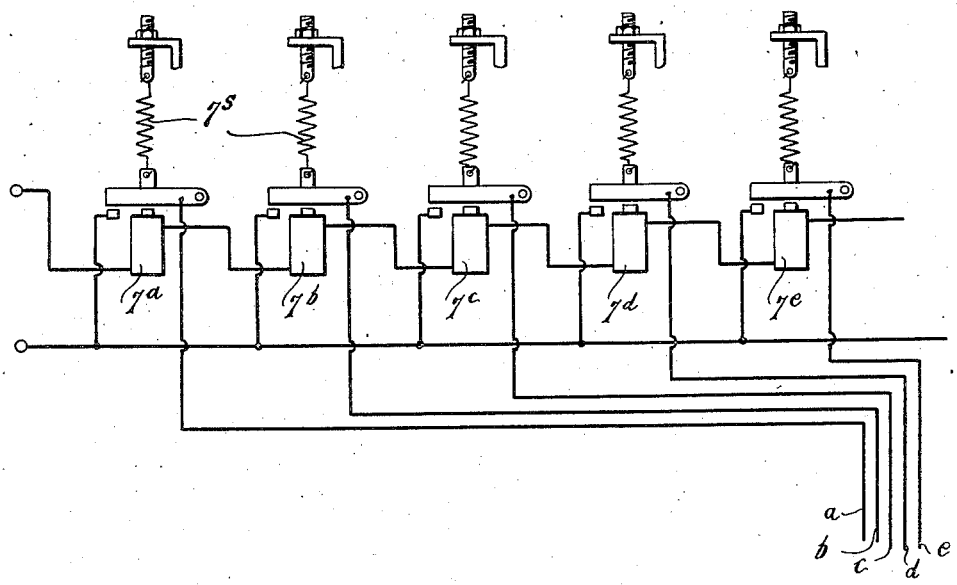
Fig. 8 shows an enlarged detail view of the output circuit shown in Fig. 2, incorporating five relays arranged in series.

The schematic arrangement of such an output circuit is illustrated (Fig. 8). The relay may conveniently be of the polarized type of any suitable style provided that resistance to the movement of the tongue in one direction may be adjusted in order that the relay may act only on the passing of an operating current representing a specific tone of the representation being transmitted. The standard type of relay is shown which of course may be easily set for a particular value of operating current by adjusting the take-off springs connected to the tongues of the relays. It will be observed that the relays 7ª, 7ᵇ, 7ᶜ, 7ᵈ, 7ᵉ are connected in series and the tongue of each relay may be adjusted by varying the tension of its take-off spring 7ˢ. It is of course possible to arrange the coil windings of the relays in parallel but the series arrangement is preferred since the higher resistance of the circuit thereby obtained is of advantage in the vacuum tube circuit employed, also a greater individual operating range is secured. The arrangement of these take-off springs is a matter however necessitating expenditure of considerable time and I prefer to use a polarized relay 8 (Fig. 2), in which the current necessary to operate the relay may be readily adjusted by means of variable resistances 8ʳ as shown in the circuit diagram of Fig. 2. In the latter circuit the biasing windings of the relays are arranged as will be observed in parallel. It is found that by this arrangement of control means, the relays may be very readily set for different values of operating. It will be understood that it is impractical to permanently adjust the relays since each picture, to obtain the best results, should be analyzed into tones depending on the range of tone of the picture; for instance supposing the variation in the operating current to amount to 20 milliamperes, from 40 to 60 milliamperes, it might be possible to obtain satisfactory rendition of the tones with relays set to operate at differences of 4 milliamperes, i. e. to operate at 44, 48 etc. The next picture sent, however, might be in the form of a transparency or negative. Now the density of the shades of the negative or print are a logarithmic function of the light received by the film on taking the photograph, and conversely. Obviously, therefore, an arithmetical progression of increase of current would not cause the relays to operate in true manner. Apart from this feature, however, there is an inherent difference in the character of the pictures to be transmitted. It might also be desired to vary the tones of the reproduction from those of the original, and it is a very important feature that this effect is readily obtained by the adjustment of the relays, as for instance to arrange them in a series operating on currents 40, 46, 51, 55, 58, 60 milliamperes. The improved control over the tone grading of the picture transmitted is, it will be realized, a very important feature of the invention.

In order that the setting of the relays of either polarized or non-polarized type may be visually verified otherwise than by observing milliammeters connected in the circuit of each relay, I provide a bank of signal lamps shown at L in Fig. 1. These lamps may be lit whenever the corresponding relay is operated and the setting of the whole apparatus may, therefore, be very readily checked by bringing tones chosen as Nos. 1, 2, 3, 4 and 5 in the series of tones being transmitted (when using a 5-unit transmitter) into the path of the pencil of light and varying the resistance in the circuit of the corresponding relay, until the lighting of the signal lamp co-operating with that relay indicates the adjustment is complete. When the desired setting of the relays has been obtained for the picture to be transmitted, the transmitting mechanism may be thrown into operation with the assurance that the adjustment of the relays has been accurately effected.

Figure 10:
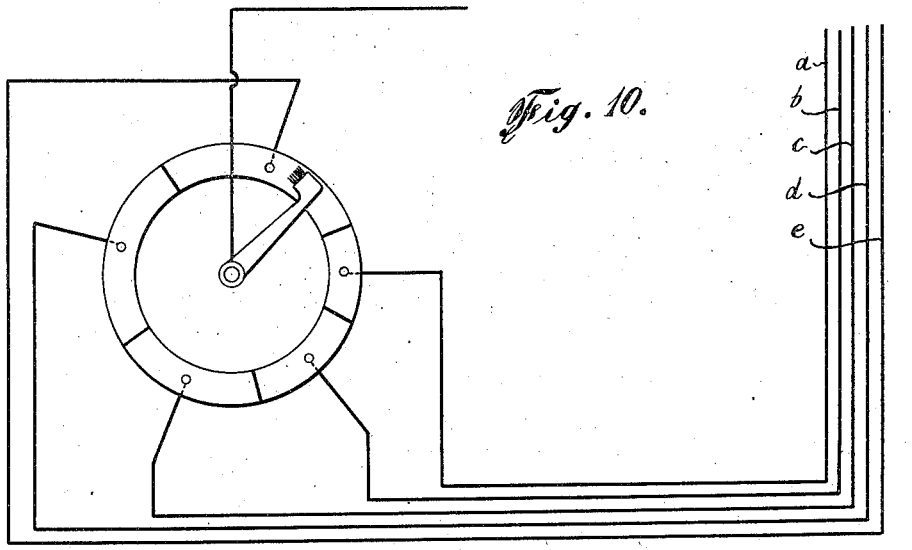

As shown in Fig. 10 the circuits controlled by the relays may be utilized for transmitting the current representing the tone of the picture directly over a telegraph line by means of a 5-segment commutator. The segments of this commutator may be either of equal length or of a length progressively greater from 1st to 5th, in order that the duration of the currents passed to the line may have a logarithmic relation corresponding to the logarithmic relation of the light intensities which produce the different depths of shade in the picture to be transmitted.

The segments of the commutator are successively connected to the line by the rotation of the brush in the way usual in multiplex telegraphy apparatus. The commutator in which the segments are of successively greater length is adapted for use with the circuit shown in Figure 7.

In accordance with Figures 7 and 10 the connections could be used when arrangement shown in Figure 7 is required to perforate a tape in which case L in Figure 7 is connected to L on Figure 10 and a, b, c, d, and e are connected to the recording mechanism in the same way as corresponding wires on Figure 2 and the five relays shown in that figure are dispensed with. The commutator arm is so geared that it makes one complete revolution during the time required to explore one unit of the picture to be transmitted. When standard perforated tape is employed one unit of the picture corresponds to one transverse row of perforations.

Figure 11:
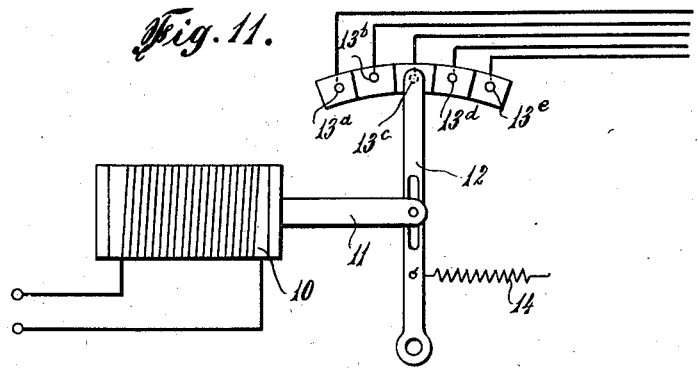
Fig. 11 shows an arrangement in which relays are dispensed with, a single solenoid taking their place. The core of the solenoid is connected to a pivoted arm swinging over a series of contacts.

In Fig. 11 the solenoid 10 is operated by an amplified modulated current. The value of the current flowing through the energizing winding of the solenoid will of course determine the movement of the core 11 and therefore of the arm 12 with which it has a pin and slot connection. The contacts 13$^a$, 13$^b$, 13$^c$, 13$^d$, and 13$^e$ on which the arm 12 moves serve to put in circuit the energizing coil of the appropriate punch or punching mechanism of the kind previously described in connection with previous figures or to connect with a particular segment as shown in Fig. 10 if it is desired to transmit directly to the line. The movement of the arm and core 11 in opposition to the pull of the solenoid may of course be effected in various ways as for instance by means of a tension spring 14. It will be apparent that the device responds to particular values of electrical intensity in that arm 11 is deflected to make contact with a particular segment according to the intensity of the current flowing through the energizing coil, the contact of each segment with the arm being dependent upon the predetermined setting of the device.

Figure 12:
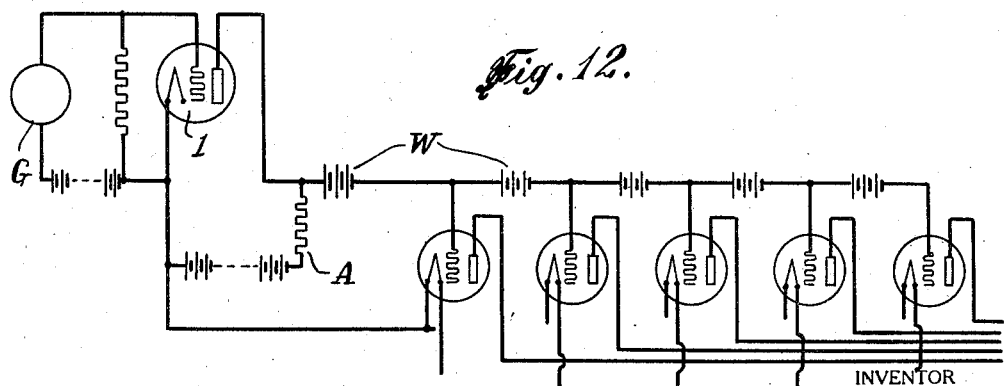
Fig. 12 shows a bank of 3-electrode devices utilized as relays.

In Fig. 12 in which 3-electrode valves are shown functioning as relays, the circuit is so adjusted that the fluctuations of plate current in tube 1 are made to cause a voltage fluctuation by means of resistance A so that the total of this voltage fluctuation will equal or exceed the range necessary to operate each tube in succession by means of successive grid voltage variations; for instance if the efficient grid voltage range of each tube is 6 volts and 5 are employed, a total range of 30 volts is required, biasing batteries W being used to ensure the correct successive operation of the thermionic valve devices.

Reference will now be had to Fig. 13. A picture or suitable representation of a picture A is mounted on a cylindrical mandrel rotated by suitable means such as gearing arranged in a gear case D. As the mandrel rotates it is advanced by a lead screw C. Light from a source F is directed by a suitable lense system upon the picture A and light reflected from an elemental area of the picture is focused on a photoelectric cell G. The apparatus thus far described in this figure acts to scan the picture A in a helical path and influence the photoelectric cell G by a beam of reflected light that varies in intensity in accordance with the tone values of the successive elemental areas of the picture.

As is well understood in the art, the varying light falling upon the photoelectric cell G imparts to the cell varying degrees of conductivity so that an undulating current is sent by battery 30 through resistance 31. This current undulates in accordance with the variations in the tone values of successive elemental areas of the picture, and causes the impression of a corresponding undulating voltage upon the input terminals 32, 32 of a well known type of push-pull amplifier 33 comprising two electronic tubes 34 and 35.

36 is a well known type of polarized relay known in the art as a British post office relay, and extensively used in duplex telegraphy. This relay comprises four windings 37, 38, 39 and 40, windings 37 and 38 being connected in series, and windings 39 and 40 being connected in series. A suitable source of alternating current 41 is connected to windings 37 and 38, and the value of the current is adjusted by rheostat 42 so as to cause the relay armature 43 to swing cylically from contact S to contact M, when no current is passing through windings 39 and 40.

A source of current 44 is so connected to contacts S and M that the relay is adapted to energize the line L with positive or spacing pulse when the armature 43 is on contact S, and with a negative or marking pulse when the armature 43 is on contact M. The connection to contacts S and M is common telegraph practice, the function of the positive pulses being merely to neutralize the energy stored up in the inductance and/or capacity of the line during the passage of the marking pulse.

Amplifier 33 delivers the amplified undulating current to relay windings 39 and 40 and is preferably connected thereto in such direction that the current flowing through windings 39 and 40 influences the armature 43 to increase the duration of the contact between 43 and M as the armature oscillates under the influence of current from source 9. The result is that the duration of the contact between armature 43 and contact M is dependent upon the tone value of the elemental area of the picture A; and hence the duration of each intermittent electrical impulse delivered to line L depends upon the tone value of an elemental area of picture A. These impulses may be transmitted by line L to a receiving station and there used to synthesize a replica of a picture A.

An alternative arrangement is for the impulses of line L to be delivered to a rotating commutator brush 45, which makes one revolution for each elemental area of picture A. If the tone value of the elemental picture area is such that armature 43 remains on contact M for the maximum time, brush 45 will cause impulses to be delivered to each of the circuits, a, b, c, d, and e. If the armature 43 remains on contact M for a lesser length of time, impulses will be delivered to only a portion of circuits a, b, c, d, and e, the number of such circuits energized being dependent upon the duration of the contact between armature 43 and the contact M, which in turn is dependent upon the tone value of the elemental picture area. The energization of circuits a, b, c, d, and e may be used to operate a standard type of machine perforator such as the Morkrum perforator to perforate a tape which is an intermediate record of the picture A. Such intermediate records are described in British Patent 197,402 previously referred to. Where the pulses on the line L are not sent to a receiving station, the ground connection 46 may be omitted as it is not necessary in such case to utilize spacing pulses between the signalling pulses.

The picture A may be positive or negative or any suitable representation of the picture and hence I include all such forms under the word "picture". I also include in the word "picture" any representation having changes in tone value such as maps, drawings, writing, etc. It is seen that the apparatus operates to deliver to line L an intermittent current in which the duration of each impulse is a measure of the tone value of an elemental area of the picture. When line L is connected to the rotating commutator, the commutator acts to convert each impulse of the line L into a succession of impulses, one impulse of the succession being delivered to circuit $a$, the next to circuit $b$, etc. In case the tone value of the elemental picture area is such that the armature 43 remains on contact M for a very small length of time, only one of the circuits $a$ to $c$ may be energized for that particular elemental area of the picture. In general, however, the pulses on line L are converted into a succession of impulses and hence it is convenient to use this expression to describe the operation of the apparatus, although there will not be a true succession in every instance. It is also seen that the line L constitutes a first circuit and the brush 45 acts to energize a succession of circuits $a$, $b$, $c$, $d$, and $e$ in accordance with the duration of the energization of the first circuit, or circuit L. Where I use such expressions as varying "in accordance with the tone values of successive elemental areas of the picture," I include varying either directly in accordance with the tone values or inversely in accordance with the tone values. The relation of one to the other is similar to that of a positive print to a negative print, and of course it makes no difference whether the record of the picture (or series of pulses representing a picture) corresponds to a positive of the picture or a negative of the picture.

In most of the embodiments of the invention hitherto discussed, the perforation of a standard telegraphic tape to render 5-tone has been described. It is understood, however, that the invention is not in any way limited to the number of tones rendered or to the employment of a standard form of perforated tape, since even when using such a tape it is possible to render 32 tones. Five tones have been found generally satisfactory for commercial use or possibly a smaller number of tones might serve the purpose required (as when transmitting a black and white drawing, signature or the like), but on the other hand a larger number of tones might be desirable when rendering the tones of a very delicately shaded subject.

It will also be realized that for ease in transmission, the standard telegraphic tape is generally suitable and convenient. An intermediate record produced need not be in the form of such a tape, some other form of record having perhaps special value in connection with some particular method of reproduction of a representation.

It is desired to point out that where the mechanism so far described is used to operate a perforator of standard type by which a standard perforated tape is produced which tape may be utilized for forming a reproduction of the transmitted picture or for sending signals, that may operate a similar perforating machine at the receiving station to form a perforated tape, it is of course feasible to send a picture analyzed into impulses directly to a receiving station without forming the intermediate record and use these signals to effect the reproduction of the representation transmitted.

It is desired to emphasize the point that as stated in the preamble to the specification, the application of the invention to the transmission of a representation of an original or the reproduction of an original is not in any way limitative of the invention, which on the contrary may be applied in any case in which it is desired to effect the operation of mechanism at a particular instant by the utilization of means serving to determine said instant, said means acting to modulate an electric current which is utilized in the operation of the mechanism desired to be actuated.

Wherever standard forms of polar relay are used the operation of such relays may be improved in various ways.

It is well known that the operation of such relays in telegraph circuits is improved by the use of vibratory circuits which have become standard. These standard vibratory circuits can be more or less directly applied to the circuits herein described. Alternatively the action of the relays may be improved by passing weak alternating current through one or more windings of the relay, for instance, through the vibrating winding thereof, or again, weak alternating current of suitable frequency may be super-imposed in any suitable manner on the operating or biasing currents of the said relays.

Another possible method for improving the operation of the relays is to supply one or more of the windings of the relay with pulsating current, for instance, by inserting an automatic make-and-break in the biasing winding or in the common return of a bank of relays, the speed of the make-and-break is preferably timed to have a definite ratio to the speed of operation of the punching mechanism as, for instance, by being operated by said punching mechanism.

It is believed that the operation of my invention will be readily understood and further explanation is not, therefore, considered necessary but a short summary thereof may be stated as follows:

The current flowing in a circuit, such as a direct current or interrupted current, is modulated by suitable means acting to render tones or variations desirable to be registered and the modulated current is transformed into a series of impulses. These impulses (telegraphic or other) are used to operate suitable mechanism.

What I claim is:—

1. The method of forming a series of electrical impulses corresponding to a picture which comprises scanning the picture and producing a current which undulates in accordance with the tone values of successive elemental areas of the picture, applying the undulating current to control the production of an intermittent current in which the duration of each impulse is a measure of the tone value of an elemental picture area, and converting each impulse of said intermittent current into a succession of electrical impulses.

2. The method of forming a series of electrical impulses corresponding to a picture which comprises scanning the picture and producing a current which undulates in accordance with the tone values of successive elemental areas of the picture, applying the undulating current to control the production of an intermittent current in which the duration of each impulse is a measure of the tone value of an elemental picture area, and converting each impulse of said intermittent current into a succession of electrical impulses, the number of impulses in the succession being dependent upon the duration of the impulse of said intermittent current.

3. The method of forming a series of electrical impulses corresponding to a picture which comprises scanning the picture and producing a current which undulates in accordance with the tone values of successive elemental areas of the picture, applying the undulating current to control the production of an intermittent current in which the duration of each impulse is a measure of the tone value of an elemental picture area, and energizing a succession of circuits with each impulse of said intermittent current.

4. The method of forming a series of electrical impulses corresponding to a picture which comprises scanning the picture and producing a current which undulates in accordance with the tone values of successive elemental areas of the picture, applying the undulating current to control the production of an intermittent current in which the duration of each impulse is a measure of the tone value of an elemental picture area, and energizing a succession of circuits with each impulse of an intermittent current, the number of energized circuits in said succession being dependent upon the duration of the impulse of said intermittent current.

5. The method of forming a series of electrical impulses corresponding to a picture which comprises intermittently energizing a first circuit, scanning the picture, determining the duration of each energization of said first circuit by the tone value of an elemental area of the picture, and energizing a succession of circuits in accordance with the duration of the energization of said first circuit.

6. The method of forming a plurality of electrical impulses corresponding to the tone value of an elemental area of a picture which comprises forming a first electrical impulse whose duration is a measure of the tone value, and converting said impulse into a plurality of electrical impulses which are similar to one another.

7. The method of forming a plurality of electrical impulses corresponding to the tone value of an elemental area of a picture which comprises forming a first electrical impulse whose duration is a measure of the tone value, and converting said impulse into a plurality of electrical impulses which are similar to one another, the number of impulses in said plurality of impulses being dependent upon the duration of said first impulse.

8. In combination, a polarized relay, a source of alternating current of substantially constant frequency, circuit connections from said source to said relay to cause the armature of said relay to vibrate, a picture, means to scan the picture and produce a current which undulates in accordance with the tone values of successive elemental areas of the picture, and circuit connections to vary the vibration of said relay armature in accordance with said undulating current.

9. In combination, a polarized relay, a source of alternating current of substantially constant frequency, circuit connections from said source to said relay to cause the armature of said relay to vibrate, and means to influence the vibration of the relay armature with an undulating current.

10. In a signaling system, a source of periodically varying current, a source of current varying in accordance with signals, a transmitting circuit, a source of signaling voltage, switching means for associating said source of signaling voltage with said transmitting circuit, said switching means being acted upon by said source of periodically varying current so as to tend to actuate it in one direction and by said second source of varying current so as to tend to actuate it in the opposite direction.

11. In a picture transmission system, a source of periodically varying current, a source of varying current modulated in accordance with the tone values of the elemental areas of the picture to be transmitted, a transmitting circuit, a source of signaling voltage, and switching means for associating said source of signaling voltage with said transmitting circuit, said switching means being actuated by said periodically varying current to tend to move said switching means in one direction and by said second source of varying current to tend to move said switching means in the opposite direction.

12. In a picture transmission system, a current operated switching device, means for impressing current upon said device for causing a switching operation during successive equal time intervals, means for determining the time of initiation of a switching operation in accordance with the tone values of elemental areas of a picture to be transmitted, and means for producing impulses of current controlled by said switching device.

13. In a picture transmission system, means for producing electrical current impulses of the same polarity during successive equal time intervals, and means for determining the time of initiation of said impulses in accordance with the tone values of elemental areas of a picture to be transmitted.

14. In a picture transmission system, means for producing electrical current impulses of the same polarity during successive equal time intervals, and means for determining both the time of initiation and of the termination of said impulses in accordance with the tone values of elemental areas of a picture to be transmitted.

MAYNARD L. D. McFARLANE.